(12) United States Patent
Ban

(10) Patent No.: US 10,838,704 B2
(45) Date of Patent: Nov. 17, 2020

(54) APPLICATION PROGRAM SETUP METHOD AND DOWNLOAD SERVER

(71) Applicant: BROTHER KOGYO KABUSHIKI KAISHA, Nagoya (JP)

(72) Inventor: Ryoji Ban, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 19 days.

(21) Appl. No.: 16/362,767

(22) Filed: Mar. 25, 2019

(65) Prior Publication Data
US 2019/0303122 A1 Oct. 3, 2019

(30) Foreign Application Priority Data
Mar. 28, 2018 (JP) .................... 2018-062043

(51) Int. Cl.
  *G06F 8/61* (2018.01)
  *G06F 16/955* (2019.01)
  *G06F 9/4401* (2018.01)

(52) U.S. Cl.
  CPC .............. *G06F 8/61* (2013.01); *G06F 9/4401* (2013.01); *G06F 16/955* (2019.01)

(58) Field of Classification Search
  CPC ....................................................... G06F 8/61
  See application file for complete search history.

(56) References Cited

U.S. PATENT DOCUMENTS

| | | | |
|---|---|---|---|
| 6,965,958 B1 | 11/2005 | Sugiyama | |
| RE39,801 E | * 8/2007 | Marbry | ................ G06F 3/1297 358/1.15 |
| 7,305,456 B2 | 12/2007 | Kobayashi | |

(Continued)

FOREIGN PATENT DOCUMENTS

JP 2016-177505 A 10/2016

OTHER PUBLICATIONS

Office Action dated Jul. 17, 2020 from related application U.S. Appl. No. 16/531,228 filed Aug. 5, 2019.

*Primary Examiner* — Chat C Do
*Assistant Examiner* — Douglas M Slachta
(74) *Attorney, Agent, or Firm* — Scully, Scott, Murphy & Presser, PC

(57) ABSTRACT

An information processing device transmits a downloading request of the installer of the application program to a download server. The downloading request contains first information identifying a model of the particular device. The download server stores second information indicating a transmission source of the downloading request together with the first information in an associated manner in a memory, and transmits the installer to the device indicated by the second information. Thereafter, the information processing device transmits a transmission request for the first information to the download server. The download server searches the memory for the second information coinciding with a transmission source of the transmission request, and transmits the first information associated with the searched second information to the device indicated by the third information. The information processing device searches for a device corresponding to the received first information and determines the same to be selected by the application program.

10 Claims, 5 Drawing Sheets

(56) References Cited

U.S. PATENT DOCUMENTS

| | | | | |
|---|---|---|---|---|
| 7,600,226 | B2* | 10/2009 | Aiba | G06F 9/4411 |
| | | | | 717/169 |
| 7,903,267 | B2* | 3/2011 | Yasui | G06F 3/1204 |
| | | | | 358/1.13 |
| 8,261,259 | B2* | 9/2012 | Hattori | G06F 3/1204 |
| | | | | 708/173 |
| 8,458,118 | B1* | 6/2013 | Hale | H04L 41/0809 |
| | | | | 707/603 |
| 9,213,512 | B1* | 12/2015 | Montierth | G06F 3/1211 |
| 2003/0169444 | A1* | 9/2003 | Kemp | G06F 3/1204 |
| | | | | 358/1.15 |
| 2007/0271267 | A1* | 11/2007 | Lim | H04N 5/4403 |
| 2009/0059272 | A1* | 3/2009 | Matsushita | H04L 41/0856 |
| | | | | 358/1.15 |
| 2012/0188600 | A1* | 7/2012 | Oshima | G06F 3/1288 |
| | | | | 358/1.15 |
| 2014/0368881 | A1 | 12/2014 | Kawaura et al. | |
| 2016/0274835 | A1* | 9/2016 | Mihira | G06F 3/1204 |
| 2016/0274883 | A1* | 9/2016 | Iida | G06F 8/61 |
| 2018/0267750 | A1* | 9/2018 | Kobayashi | G06F 3/1258 |

* cited by examiner

US 10,838,704 B2

APPLICATION PROGRAM SETUP METHOD AND DOWNLOAD SERVER

CROSS-REFERENCE TO RELATED APPLICATION

This application claims priority under 35 U.S.C. § 119 from Japanese Patent Application No. 2018-062043 filed on Mar. 28, 2018. The entire subject matter of the application is incorporated herein by reference.

BACKGROUND

Technical Field

The present disclosures relate to an application program setup method and a download server.

Related Art

There are known application programs which control, when executed by a controller, devices such as a printer or a scanner. There has been known a technique related to such an application program in which, after a print application program is installed in a device, the print application program searches for printers, and selects one to be used from among the searched printers.

SUMMARY

In order to control a device with an application program, it is necessary that a user manually selects a device to be controlled (hereinafter, referred to as an objective device) by the application program through a screen which is provided by the application program. Such a manually-performed objective device selecting operation is troublesome for the user and an improvement has been desired.

In consideration of the above, aspects of the present disclosures provide a technique with which the troublesome operation of the user to setup an application program for controlling an objective device can be reduced.

According to aspects of the present disclosures, there is provided a setup method of setting up an application program for an information processing system including an information processing device and a download server communicable with the information processing device and storing an installer of the application program, the application program being a program causing, when executed, the information processing device to control a particular device. The method has transmitting, by the information processing device, a downloading request of the installer of the application program to the download server, the downloading request containing first information identifying a model of the particular device. When the download server receives the downloading request, the method stores, with the download server, second information indicating a transmission source of the downloading request and the first information contained in the downloading request in an associated manner in a memory. When the download server receives the downloading request, the method transmits, by the download server, the installer to the information processing device indicated by the second information. After the information processing device receives the installer, the method transmits, by the information processing device, a transmission request requesting for the first information stored in the memory to the download server at a particular timing. When the download server receives the transmission request, the method searches the memory, with the download server, for the second information coinciding with third information indicating a transmission source of the transmission request in the memory, retrieves, by the download server, the first information associated with the second information as searched from the memory, and transmits, by the download server, the first information as retrieved to the information processing device indicated by the third information. When the information processing device receives the first information from the download server, the method searches, with the information processing device, for a device corresponding to the received first information and determining the searched device as a device to be selected by the application program.

According to aspects of the present disclosures, there is provided a download server having a communication interface, a memory and a controller. The controller is configured to execute receiving, through the communication interface, a downloading request requesting downloading of an installer of an application program, the downloading request including first information indicating a model of a device to be controlled by the application program. Further, when the downloading request is received through the communication interface, the controller executes storing second information indicating a transmission source of the downloading request and the first information in the memory in an associated manner, and transmitting the installer of the application program to the information processing device indicated by the second information through the communication interface. After transmission of the installer, the controller receives, through the communication interface, a transmission request requesting for transmission of the first information. When the transmission request of the first information is received, the controller executes searching the memory for second information coinciding with third information indicating a transmission source of the transmission request, retrieving the first information stored in the memory in association with the second information as searched, and transmitting the retrieved first information to the information processing device indicated by the third information through the communication interface.

BRIEF DESCRIPTION OF THE ACCOMPANYING DRAWINGS

DETAILED DESCRIPTION OF THE EMBODIMENTS

Hereinafter, a setup method according to a first illustrative embodiment of the present disclosures will be described, referring to the accompanying drawings. It is noted that, according to the first embodiment, a method of downloading an application program (hereinafter, referred to as an APP) and setting it up will be described.

Figure 1:
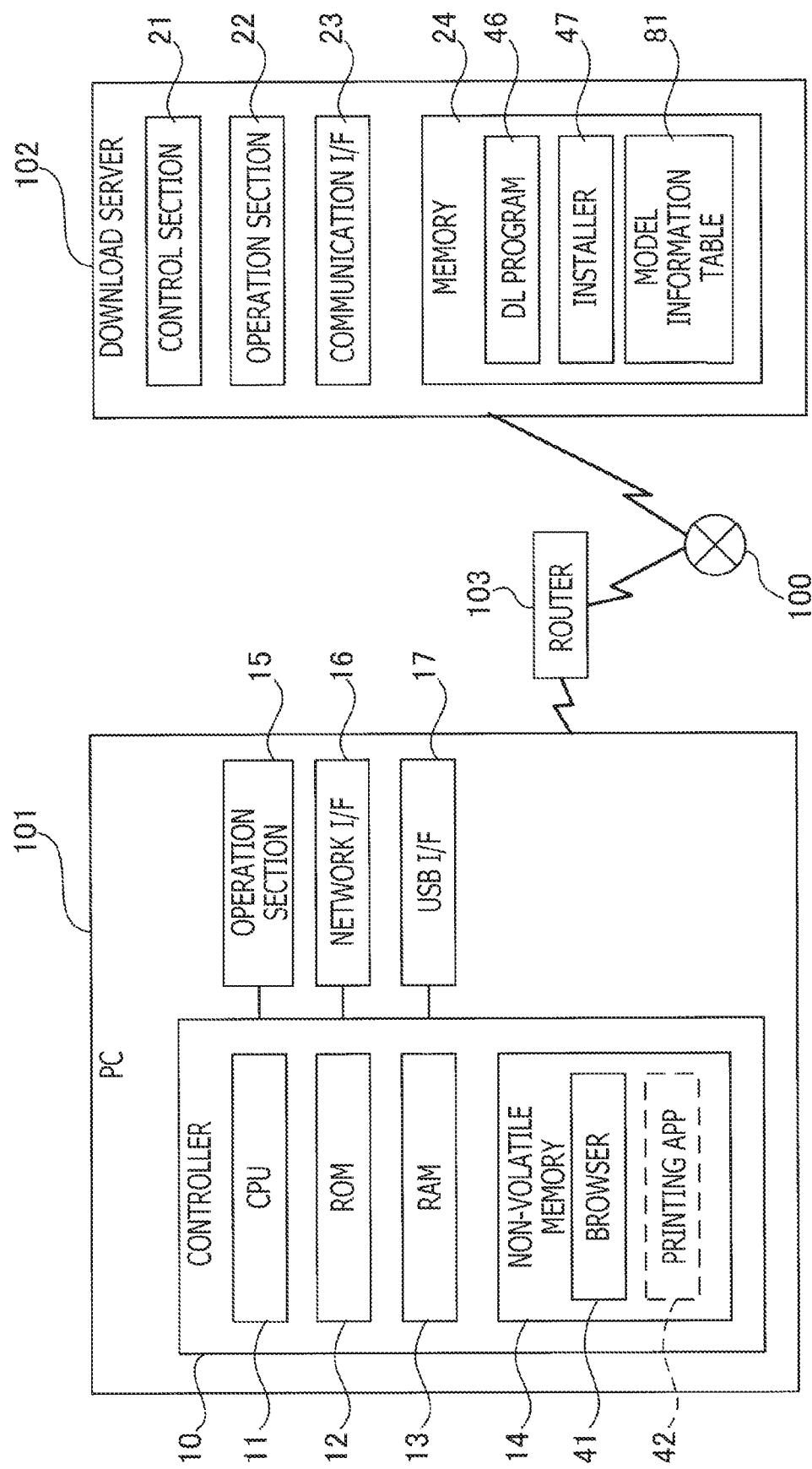
FIG. 1 is a block diagram showing an electrical configuration of a download system according to aspects of the present disclosures.

According to the setup method of the first illustrative embodiment, as shown in FIG. 1, a personal computer (hereinafter, referred to as a PC) 101, which is connectable to the Internet 100, is configured to access a download server 102 through the Internet 100 and downloads a printing APP 42 therefrom.

The PC 101 is a device configured to execute various programs. The PC 101 includes, as shown in FIG. 1, a controller 10 including a CPU 11, a RAM 12, and a RAM 13 and a non-volatile memory 14. The PC 101 is further provided with an operation section 15, a network I/F 16 and a USB I/F 17, which are electrically connected to the controller 10. It should be noted that the "controller" 10 in FIG. 1 is a collective name covering hardware and software used for controlling the PC 101. Accordingly, the controller 10 does not necessarily indicate a single piece of hardware existing in the PC 101.

The ROM 12 stores a program for starting up the PC 101 and other programs. The RAM 13 serves as a work area when various programs are executed and/or a data storage area for temporarily storing data. The non-volatile memory 14 is, for example, an HDD, a flash memory and the like and is used as an area for storing various programs, data such as image data and/or various settings. The CPU 11 executes various processes in accordance with programs retrieved from the ROM 12 or the non-volatile memory 14, or in accordance with user instructions.

The operation section 15 is hardware including, for example, a displaying device and inputting devices such as a keyboard and a mouse. The operation section 15 receives user operations. The operation section 15 also serves to display various pieces of information. The operation section 15 may be a user interface having both an input function and an output function (e.g., a touch panel).

The network I/F 16 includes hardware to communicate with an external device through the Internet 100. A communication method employed by the network I/F 16 may be a wired or a wireless one, and can be of any standard (e.g., LAN, Wi-Fi®). According to the first embodiment, the PC 101 is connected to the Internet 100 through a router 103. The router 103 is a device configured to relay between networks. Further, the USB I/F 17 includes hardware to communicate with another device (e.g., a printer). It is noted that devices may be connected to the PC 101 through the network I/F 16.

In the non-volatile memory 14 of the PC 101, various programs including a browser 41 are stored. The browser 41 is a program configured to display web pages. When the PC 101 downloads an installer of the printing APP 42, the downloaded installer is stored in the non-volatile memory 14. Further, when setup of the printing APP 42 is completed, the printing APP 42 itself is stored in the non-volatile memory 14.

As shown in FIG. 1, the download server 102 includes a control section 21, an operation section 22, a communication I/F 23 and a memory 24, and is configured to execute various programs. The communication I/F 23 includes hardware to communicate with an external device through the Internet 100. The download server 102 is not necessarily be configured by a single device but configured to operate as multiple devices which cooperate with each other. For example, at least a part of the memory 24 may be provided to another device which is accessible by the download server 102. It should be noted that such a configuration is also included in an expression "the memory 24 of the download server 102" used in the following description.

It is noted that the memory 24 of the download server 102 includes, for example, a ROM, a RAM and/or an HDD, and various programs and/or various pieces of data are stored therein. For example, in the memory 24, a download program (hereinafter, referred to as a DL program) 46 and an installer 47 of the printing APP 42 are stored. It is noted that, although only one installer 47 is indicated in FIG. 1, the download server 102 may store, for example, multiple kinds of APP's including the installer of the APP 42 and manuals, and select a program and/or data subject to a downloading request and transmit the same to a requesting source device.

Next, an operation to set up the printing APP 42 to the PC 101 will be described, referring to FIGS. 2 and 3. It is noted that processes and processing steps in the following description are basically processes of the CPU 11 or the controller 21 in accordance with instructions described in programs such as the installer 47. Further, the processes by the CPU 11 and the processes by the OS of the PC 101 are described without discrimination, and the processes by the controller 21 and the processes by the OS of the download server 102 are described without discrimination.

When, for example, the user of the PC 101 has newly bought a printer, the user obtains the printing APP 42 for controlling the newly bought printer through the PC 101 by downloading the same. The PC 101 receives, for example, a user operation instructing setup of the printing APP 42 through a webpage or the like provided by a manufacturer of the printer or a manufacturer of the printing APP 42. For example, as illustrated in a sequence chart shown in FIG. 2, the PC 101 communicates with the download server 102 and performs setup of the printing APP 42.

In accordance with the user operation, the PC 101 starts up the browser 41 (procedure 51) to display a webpage, and receives input of a URL (procedure 52). The URL input in the browser 41 may be one described in a product manual or the like.

The URL includes information for executing a LD program 46 of the download server 102 which is a request destination of downloading. In addition, the URL includes model information of the printer. For example, in an exemplary URL below (see example 1), a character string on a right-side with respect to "?" symbol is a query parameter including the model information of "modelA." The model information included in the query parameter is information discriminating models of devices and an example of a first information, while the URL including the model information by the query parameter is an example of URL which includes the first information as a query type character string.

http://www.xxxxx.co.jp/product/
    appName?printer=modelA . . . (example 1)

It is noted that, for different models of the printers, different query parameters are included in the URL. For example, for a model "modelB" which is different from "modelA" of example 1 above, the download requesting URL is expressed as indicated below (see example 2).

http://www.xxxxx.co.jp/product/
    appName?printer=modelB . . . (example 2)

Portions of the download requesting URL's for different models are the same except for the query parameters, and indicate that the DL program 46 of the download server 102 is executed. When the download server 102 has downloaded the download requesting URL including the query parameter, the download server 102 executes the LD program 46 so that the model information is obtained from the query parameter. It is noted that the download requesting URL is an example of a downloading request, and procedure 53 is an example of a downloading requesting step and a downloading request receiving process.

Figure 2:
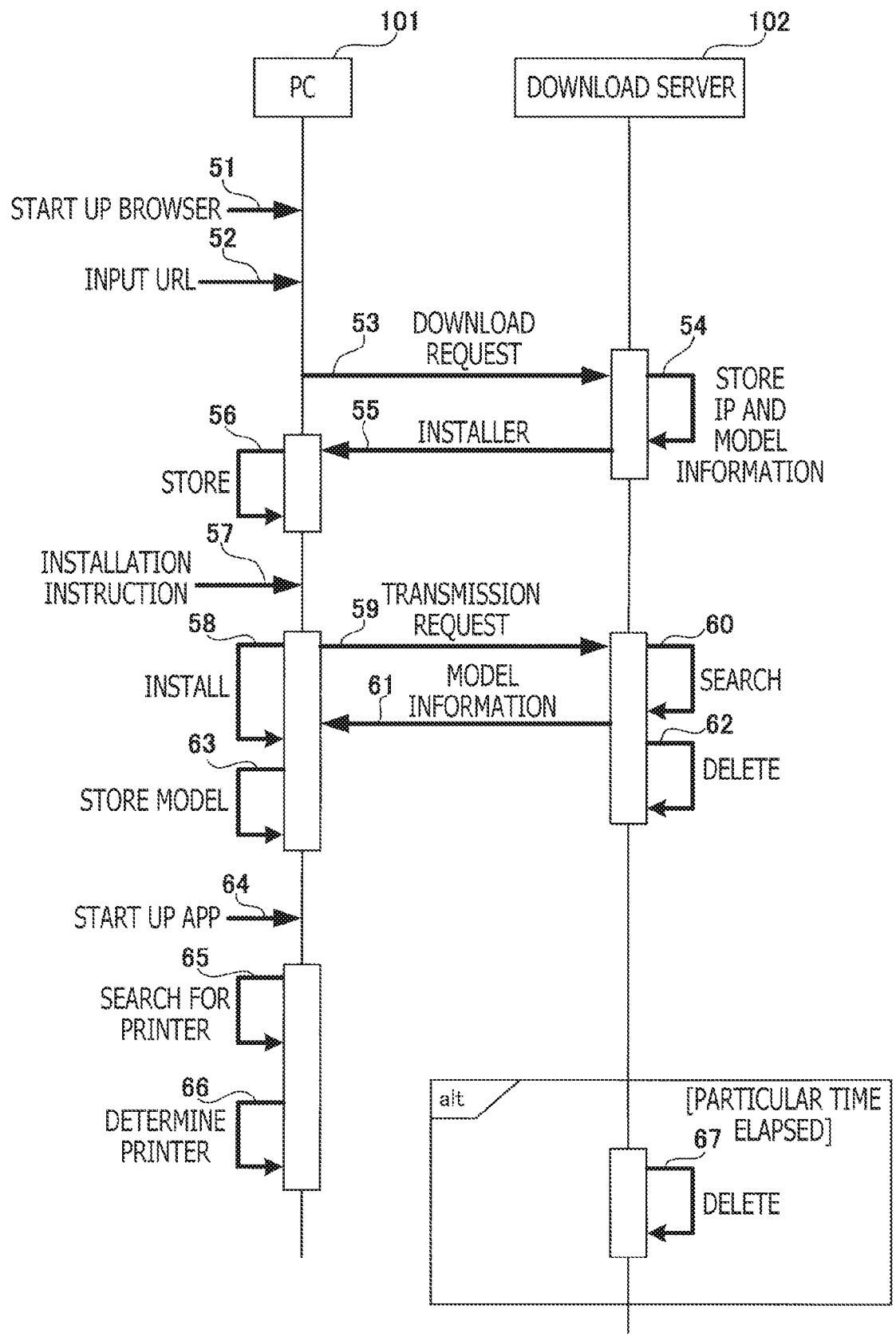
FIG. 2 is a sequence chart illustrating a setup procedure according to a first illustrative embodiment of the present disclosures.
Figure 3:
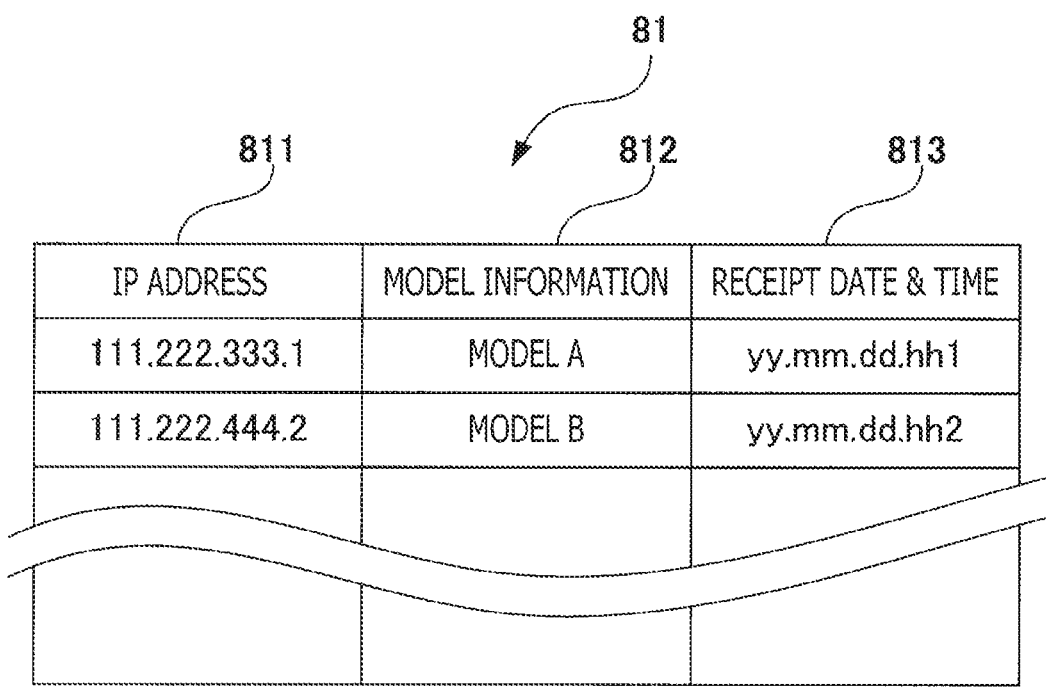
FIG. 3 illustrates a configuration of a model information table.

The download server 102 stores an IP address, which indicates a transmission source of the downloading request as received and indicates a transmission destination to which the installer 47 is to be transmitted, and the model information obtained from the query parameter of the URL in an associated manner (procedure 54) as shown in FIG. 2. The IP address indicating the transmission source (i.e., the PC 101) which transmits the downloading request is an example of second information. Procedure 54 is an example of a storing step and a storing process.

The download server 102 has a model information table 81 in the memory 24. An example of a configuration of the model information table 81 is shown in FIG. 3. As shown in FIG. 3, in the model information table 81, IP address 811, model information 812 and receipt date and time 813 are stored in an associated manner. The IP address is information of the IP address indicating the device which has transmitted the downloading request. It is noted that, normally, the PC 101 is connected to the router 103, and the downloading request is transmitted through the router 103. The IP address 811 when the downloading request is transmitted through the router 103 is the IP address of the router 103. Therefore, the IP address of the router 103 is an example of the IP address indicating the PC 101.

The model information 812 is model information included in the query parameter of the downloading request. It is noted that, when the query parameter is not included in the downloading request, the download server 102 does not store the same in the model information table 81. The receipt date and time 813 is information on date and time when the download server 102 received this download request.

Then, as shown in FIG. 2, the download server 102 transmits the installer 47 of the printing APP 42 of which downloading is requested to the PC 101 (procedure 55). Procedure 55 is an example of an installer transmitting step and an installer transmitting process. The PC 101 receives the installer 47 transmitted from the download server 102 and stores the same in the non-volatile memory 14 (procedure 56). When reception of the installer 47 is completed, the PC 101 displays information indicating completion of downloading and a button for receiving an instruction to start installing on the operation section 105.

When the user operation to start installing is received (procedure 57), the PC 101 starts up the installer 47 to start installing the printing APP 42 (procedure 58). During a period from the start to the end of installation of the printing APP 42 by the installer 47, the PC 101 transmits a transmission request requesting the download server 102 to transmit model information to the download server 102 (procedure 59). Procedure 59 is an example of a device information requesting step. A timing at which procedure 59 is performed and at which the installer 47 is being executed is an example of a predetermined timing.

The download server 102 receives the transmission request transmitted by the PC 101 (procedure 59). Therefore, procedure 59 is also an example of a transmission request receiving process. Then, the download server 102 searches the IP addresses 811 of the model information table 81 for one coinciding with the IP address indicating the transmission source of the transmission request. The IP address indicating the PC 101 which has transmitted the transmission request is an example of third information. Further, when the IP address which coincides with the IP address 811 of the transmission source of the transmission request is found, the download server 102 retrieves the model information 812 which is stored in association with the IP address 811 as found (procedure 60).

In the model information table 81, the model information 812 included in the downloaded request has been stored in association with the IP address 811 indicating the transmission source of the download request in procedure 54. If the IP addresses of the PC 101 when the download request was transmitted and when the transmission request was transmitted coincide with each other, the download server 102 can search for the corresponding model information from the model information table 81. In general, many users tend to start installation immediately after downloading the installer 47, it is very likely that the two IP addresses coincide with each other.

As shown in FIG. 2, the download server 102 transmits the model information 812 retrieved in procedure 60 to the PC 101 which has transmitted the transmission request (procedure 61). Procedure 61 is an example of a device information transmitting step and a transmission request responding process. Further, the download server 102 deletes the model information 812 which has been transmitted and the IP address associated therewith from the model information table 81 (procedure 62).

During execution of the installer 47, the PC 101 receives the model information 812 transmitted from the download server 102 (procedure 61). Further, based on the received model information 812, the installer 47 stores information regarding an objective model of the printing APP 42 (i.e., a model to be controlled by the printing APP 42 for printing) in the non-volatile memory 14 of the PC 101 (procedure 63). The installer 47 makes the PC 101 generate a file at a particular storage place from which the printing APP 42 can read, and store information based on the received model information 812 into the file as generated.

When the IP address 811 coinciding with the IP address indicating the transmitting source of the transmission request is not included in the model information table 81, the download server 102 transmits information indicating that the model information 812 is not included in the model information table 81 to the PC 101 (procedure 61), and skips procedure 62. When information received during execution of the installer 47 is information indicating that the model information 812 is not included in the model information table 81, the PC 101 skips procedure 63.

Then, the PC 101 receives the user operation to instruct startup of the printing APP 42 (procedure 64). During execution of the printing APP 42, the PC 101 retrieves information based on the model information 812 from a particular storage area, and searches for printers corresponding to the retrieved information by means of broadcasting or multicasting (procedure 65). Further, the PC 101 automatically determines the searched printer as the objective device of the printing APP 42 (procedure 66). Procedure 66 is an example of a determining step.

The model information 812 is information of a model of the printer corresponding to the downloading request. Accordingly, as an initial setting of the printing APP 42, the model of that printer is set. That is, the printing APP 42 automatically determines the printer of which model is included in the downloading request of the installer 47 of the printing APP 42 as the objective device to be used for printing. For example, when selectable functions or setting screens are different depending on the models, the printing APP 42 displays the print setting screen corresponding to the model information 812.

When multiple printers are searched as printers corresponding to the model information 812 in procedure 65, the PC 101 may automatically determine one of them or accept the user's selection. After the startup of the printing APP 42, when information regarding the model of a printer is not stored in the particular storage area, the PC 101 may search for all the models controllable by the printing APP 42 instead of procedures 65 and 66. Then, the PC 101 may acquire the user's selection from among the searched printers as the initial setting of the printer of the printing APP 42.

Then, the download server 102 checks, for example, periodically, receipt dates and times 813 stored in the model information table 81, and determines whether information representing date and time elapsed by a particular time from the receipt thereof is included in the model information table 81. Then, the download server 102 deletes the IP address 811 and the model information 812 which is information indicating elapse of the particular time since it was stored in the model information table 81 (procedure 67), as shown in FIG. 2. Procedure 67 is an example of a deleting process.

It is noted that "periodically" means, for example, once an hour or once a day. It is noted that the timing for checking is not necessarily be periodical. For example, the checking may be performed when an amount of data stored in the model information table 81 exceeds a particular amount or when a user instruction to execute is received. Further, the particular time period may be six hours, 12 hours or one day. By appropriately deleting data, the amount of data stored in the model information table 81 stored in the memory 24 of the download server 102 is limited, thereby a load to the memory 24 being reduced.

According to the setup method as described above, the download server 102 stores the IP address 811 of the device which issued the downloading request of the installer 47 of the printing APP 42 and the model information 812 included in the query parameter of the URL in the model information table 81 in an associated manner. The PC 101 transmits the transmission request to the download server 102 during installation performed by the installer 47. Then, the download server 102 searches the IP addresses in the model information table 81 for the IP address indicating the transmission source of the transmission request, and transmits the model information 812 which is stored in association with the searched IP address 811 to the PC 101. Then, the PC 101 searches for the printer corresponding to the received model information 812, and automatically determines the searched printer as a printer to be selected by the printing APP 42. Accordingly, a selecting operation to select a device to be controlled by the printing APP 42 can be omitted.

Next, a setup method according to a second illustrative embodiment of the present disclosures will be described, referring to the accompanying drawings. According to the second embodiment, the PC 101 only performs installation of the printing APP 42 during execution of the installer 47, and transmits the transmission request during execution of the printing APP 42. Thus, the second embodiment is different from the first embodiment in that the transmission request is transmitted during execution of the installer 47 in the first embodiment. The setup method according to the second embodiment is different from the setup method according to the first embodiment only by the transmission timing of the transmission request. Therefore, the procedures the same in both the first and second embodiments are assigned with the same procedure numbers and description thereof will be omitted.

Figure 4:
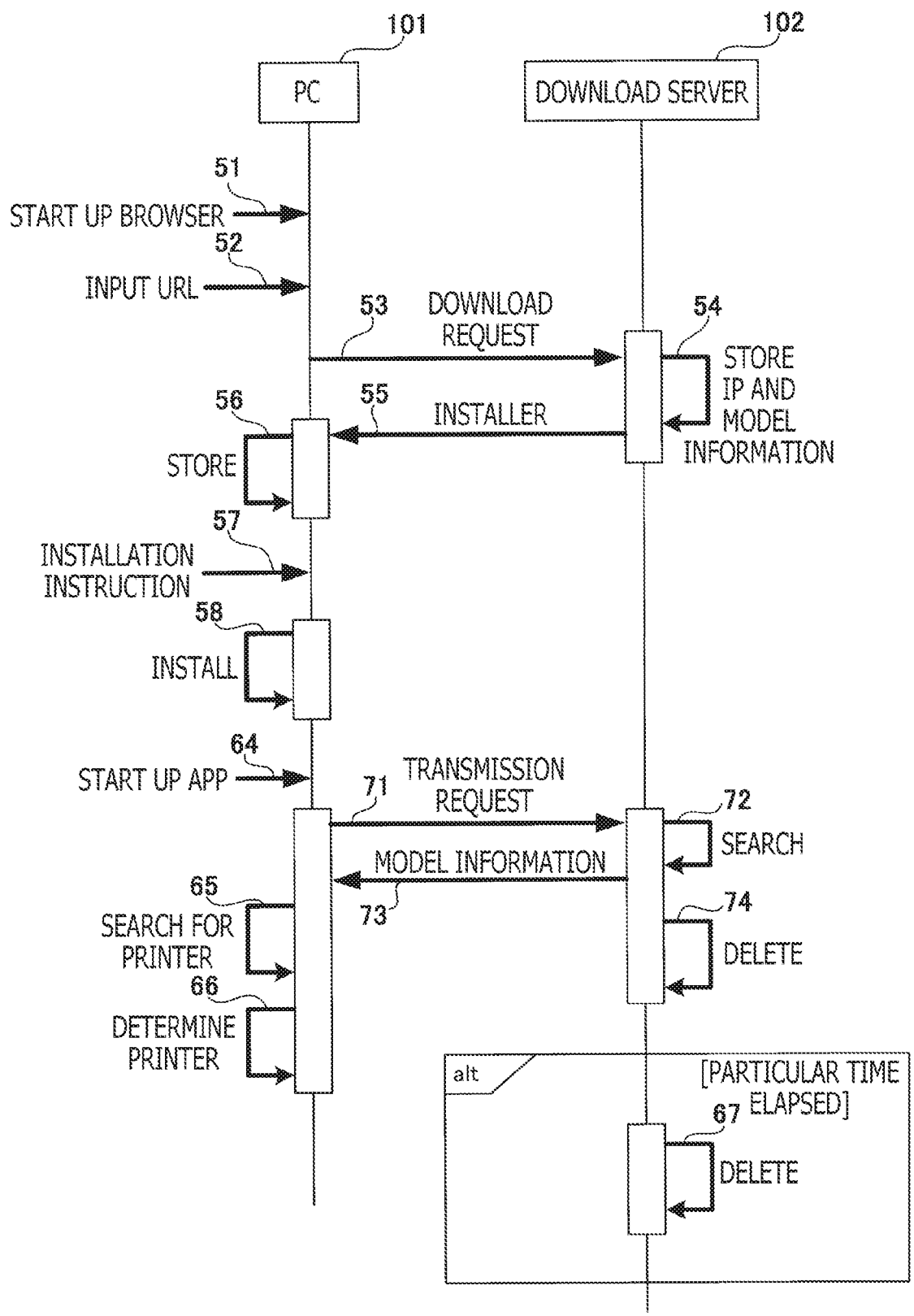
FIG. 4 is a sequence chart illustrating a setup procedure according to a second illustrative embodiment of the present disclosures.

In the setup method according to the second embodiment, as shown in FIG. 4, in response to receipt of an instruction to start installation (procedure 57), the PC 101 starts installation of the printing APP 42 by the installer 47 (procedure 58). Thereafter, the PC 101 receivers the user operation to instruct startup of the printing APP 42 (procedure 64).

In response to receipt of the instruction to start up the printing APP 42, the PC 101 starts up the printing APP 42 and transmits a transmission request which requests transmission of the model information to the download server 102 (procedure 71). The request transmitted in procedure 71 includes the same information as included in the request transmitted in procedure 59 (see FIG. 2) of the first embodiment. According to the second embodiment, procedure 71 is an example of a device information requesting step. It is noted that a timing at which procedure 71 is performed and during execution of the printing APP 42 is an example of a particular timing. It is further noted that the execution timing of procedure 71 could be, for example, any time before execution of printing, and may be a timing at which the printing APP 42 is firstly executed or after receipt of the instruction to perform printing. Alternatively, the PC 101 may perform procedure 71 when a printer is unselected when the printing APP 42 is started up.

The download server 102 receives the transmission request which is transmitted by the PC 101 in procedure 71. Procedure 71 is also an example of a transmission request receiving process. Then, the download server 102 searches the IP addresses of the model information table 81 for one coinciding with the IP address indicating the transmission source of the transmission request. Further, when the IP address 811 coinciding with the IP address indicating the transmission source of the transmission request is found, the download server 102 retrieves the model information 812 which is stored in association with the found (i.e., searched) IP address 811 (procedure 72).

As shown in FIG. 4, the download server 102 transmits the retrieved model information 812 to the PC 101 from which the transmission request was received (procedure 73). Procedure 73 is an example of a device information transmitting step and a transmission request responding process. Further, the download server 102 deletes the model information 812 and the associated IP address 811, which have been transmitted to the PC 101, from the model information table 81 (procedure 74).

The PC 101 searches for printers corresponding to the received model information 812 by means of, for example, broadcasting or multicasting (procedure 65). Further, the PC 101 automatically determines the found printer as the objective device of the printing APP 42 (procedure 66).

As described in detail, according to the second embodiment, the PC 101 performs both transmission of the transmission request and determination of the printer during execution of the printing APP 42. By the setup method according to the second embodiment, the device to be selected by the printing APP 42 is automatically determined and the selection operation of the device can be omitted.

According to the second embodiment, the installer 47 only performs installation of the printing APP 42. Therefore, in comparison with the first embodiment, it is likely that installation is completed within a shorter period than in the first embodiment. It should be noted that, after installation, there could be a case where the PC 101 is terminated or restarted before the printing APP 42 is started and the IP address is changed. If the IP addresses are different at a time of transmission of the downloading request and at a time of transmission of the transmission request, the download server 102 cannot find the IP address 811 from the model information table 81, and may not obtain the model information. According to the first embodiment, since the installer 47 performs the transmission request, such an disadvantage can be avoided.

Next, a setup method according to a third illustrative embodiment will be described, referring to the accompanying drawings. According to the third embodiment, the PC 101 performs reception of the model information 812 and determination of the printer during execution of the installer 47. Such a configuration is different from the first embodiment in which the installer 47 stores the received model information 812 or the second embodiment in which reception of the model information 812 is performed during execution of the printing APP 42. The setup method according to the third embodiment is different from the setup method according to the first embodiment in that only timings of determination of the printer are different. Therefore, the same procedures will be assigned with the same procedure numbers and description thereof will be omitted.

Figure 5:
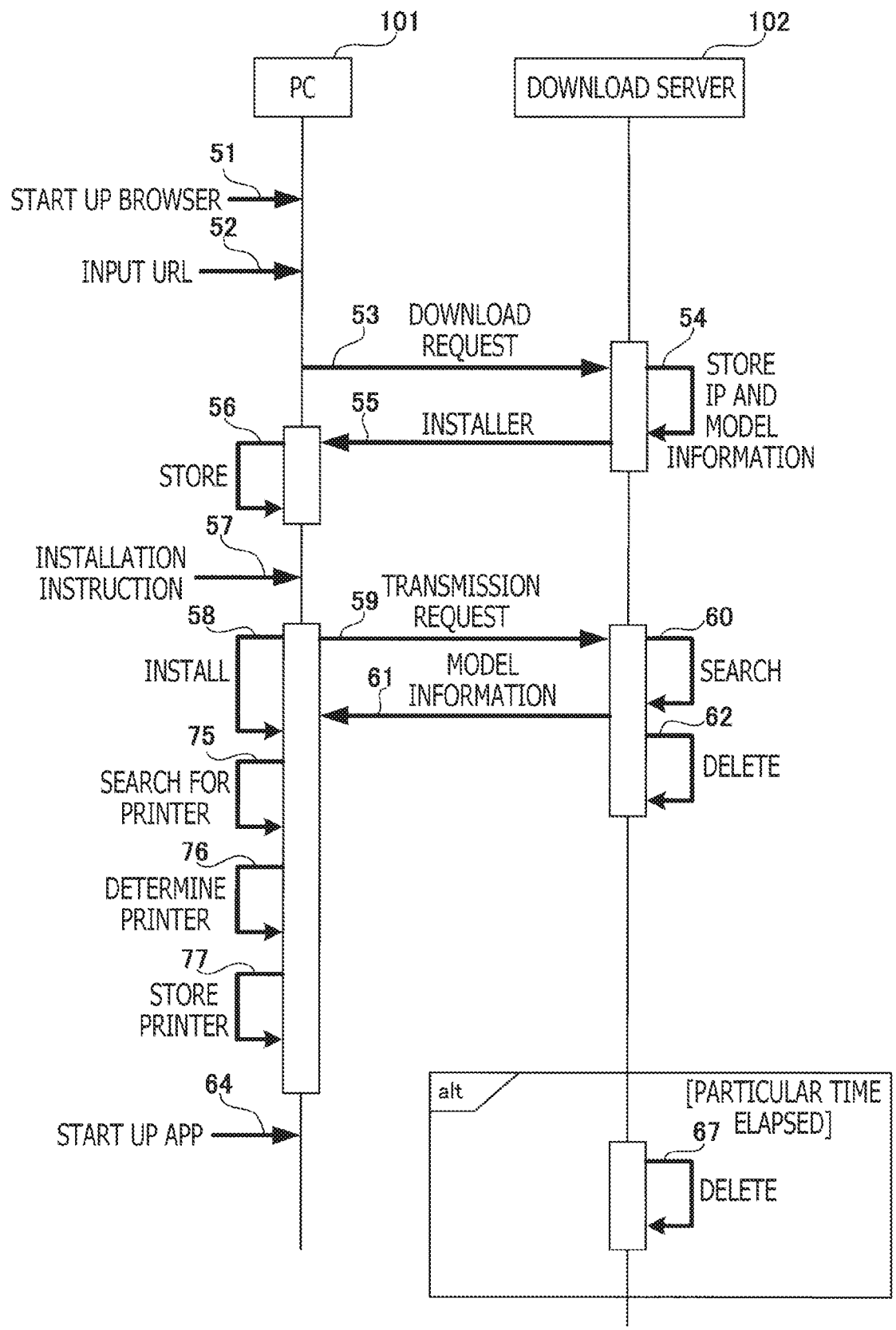
FIG. 5 is a sequence chart illustrating a setup procedure according to a third illustrative embodiment of the present disclosures.

According to the third embodiment, as shown in FIG. 5, the PC 101 starts installation of the printing APP 42 by the installer 47 (procedure 58) in response to receipt of an instruction to start installation (procedure 57). Further, similar to the first embodiment, the PC 101 transmits the transmission request requesting transmission of the model information to the download server 102 during execution of the installer 47 (procedure 59). Procedure 59 is an example of a device information requesting step. Further, a timing which is an execution timing of procedure 59 and during execution of the installer 47 is an example of a particular timing.

According to the third embodiment, the PC 101 receives the model information 812 transmitted from the download server 102 during execution of the installer 47 (procedure 61), and searches for the printers corresponding to the received model information 812 (procedure 75). Then, the PC 101 automatically determines the found printer as the objective device to be controlled by the printing APP 42 (procedure 76). Procedure 76 is an example of a determining step. Then, the installer 47 causes the PC 101 to store the determined printer information in, for example, a particular storage area from which the printing APP 42 can retrieve the printer information (procedure 77).

According to the third embodiment, the printer is determined during execution of the installer 47. Therefore, it becomes unnecessary to search the printer after startup of the printing APP 42, thereby operations after startup of the printing APP 42 being simplified. On the other hand, when the printing APP 42 is being installed, the printer to be used may not be connected to the PC 101. In such a case, the PC 101 cannot find the printer corresponding to the model information 812 received from the download server 102, and determination of the device may be failed. According to the first embodiment or the second embodiment, such a disadvantage can be avoided since the device is determined after the printing APP 42 is started.

It is noted that the configurations according to embodiments described above are only examples, and are not intended to limit aspects of the present disclosures. Various modifications and improvements can be achieved without departing from aspects of the present disclosures. For example, the device connected to the PC 101 should not be limited to the printer, but could be any device (e.g., a copier, an MFP and the like) which is controlled by the printing APP 42. The number of devices (e.g. printers) connected to the PC 101 may be more than one.

An APP which is set up according to the above-described methods need not be limited to the printing APP 42. For example, an APP for scanning can also be set up according to the above-described methods. In such a case, the device to be controlled by the APP is a device (e.g., a scanner) configured to obtain image data.

According to the above-described embodiments, the PC 101 is configured to receive the instructions of downloading, installation and startup by means of the user operations, respectively. The aspects of the present disclosures need not be limited to such a configuration. For example, when the PC 101 receives the user operation to instruct downloading of the installer, the PC 101 may execute downloading and installation subsequently. Alternatively, when the PC 101 receives the user operation to install the printing APP 42 and the installation has been completed, the installer 47 may be configured to automatically start up the printing APP 42.

Deletion in procedure 62 may not be performed. That is, the download server 102 may keep storing the model information 812 after transmitting the model information 812 in response to the transmission request. In such a case, the model information 812 may be deleted in procedure 67 after a particular period has elapsed.

Further, an input method of the URL need not be limited to input, by the user, through the webpage. For example, the URL may be input with use of a QR Code® containing information on the URL. For example, a QR code indicating the URL of the installer 47 to which the above-described query parameter is added may be printed or adhered on a package of the printer, an operation manual, an outer surface of the printer or the like. Recently, smartphones and tablet computers are provided with cameras. For a user using the printing APP 42 on such a mobile device (i.e., a smartphone or a tablet computer), it is sufficient to read the QR code with the camera provided to the mobile device and access the URL with use of an APP analyzing the QR code. According to such a configuration, the download server 102 can obtain the model information without making the user conscious about a selecting operation of a device. In particular, when the QR code is printed or adhered on the package or outer surface of the printer, only one QR code corresponding to the printer need to be provided, the user is not made conscious about the device selecting operation.

The processes described above may be performed by a single CPU, a plurality of CPU's, hardware such as an ASIC or a combination of all or part of the same. It is noted that the processes described above are realized as a recording medium containing programs therefor, methods or any other modes.

What is claimed is:

1. A setup method of setting up an application program for an information processing system including an information processing device and a download server communicable with the information processing device and storing an installer of the application program, the application program being a program causing, when executed, the information processing device to control a particular device, the method comprising:
transmitting, by the information processing device, a downloading request of the installer of the application program to the download server, the downloading request containing first information identifying a model of the particular device;
when the download server receives the downloading request, storing, with the download server, second information indicating a transmission source of the downloading request and the first information contained in the downloading request in an associated manner in a memory;

when the download server receives the downloading request, transmitting, by the download server, the installer to the information processing device indicated by the second information;

after the information processing device receives the installer, transmitting, by the information processing device, a transmission request requesting for the first information stored in the memory to the download server at a particular timing;

when the download server receives the transmission request:
- searching the memory, with the download server, for the second information coinciding with third information indicating a transmission source of the transmission request in the memory;
- retrieving, by the download server, the first information associated with the second information as searched from the memory; and
- transmitting, by the download server, the first information as retrieved to the information processing device indicated by the third information; and when the information processing device receives the first information from the download server, searching, with the information processing device, for a device corresponding to the received first information and determining the searched device as a device to be selected by the application program.

2. The setup method according to claim 1,
wherein, when the information processing device receives the installer, the information processing device starts executing the installer,
wherein the particular timing is a timing during execution of the installer,
wherein, during execution of the installer, the information processing device receives the first information from the download server and determines the device to be selected by the application program.

3. The setup method according to claim 1,
wherein the application program is executable after the installer is executed to install the application program to the information processing device,
wherein the particular timing is a timing of startup of the application program,
wherein, during execution of the application program, the information processing device receives the first information from the download server and determines the device to be selected by the application program.

4. The setup method according to claim 1,
wherein, when the information processing device receives the installer, the information processing device starts executing the installer,
wherein the particular timing is a timing during execution of the installer,
wherein, during execution of the installer, the information processing device receives the first information from the download server and stores the received first information as a file which is readable by the application program,
wherein the application program is executable after the installer is executed to install the application program to the information processing device,
wherein, during execution of the application program, the information processing device reads the first information, searches for the device corresponding to the first information and determines the device to be selected by the application program.

5. The setup method according to claim 1,
wherein the second information includes an IP address of the information processing device.

6. The setup method according to claim 1,
wherein the second information includes an IP address of a router relaying between the information processing device and the download server.

7. The setup method according to claim 1,
wherein the downloading request includes a URL of the download server containing the first information in a query format.

8. A download server, comprising:
a communication interface;
a memory; and
a controller,
the controller is configured to execute:
receiving, through the communication interface, a downloading request requesting downloading of an installer of an application program, the downloading request including first information indicating a model of a device to be controlled by the application program;

when the downloading request is received through the communication interface:
- storing second information indicating a transmission source of the downloading request and the first information in the memory in an associated manner; and
- transmitting the installer of the application program to the information processing device indicated by the second information through the communication interface;

after transmission of the installer, receiving, through the communication interface, a transmission request requesting for transmission of the first information;

when the transmission request of the first information is received:
- searching the memory for second information coinciding with third information indicating a transmission source of the transmission request;
- retrieving the first information stored in the memory in association with the second information as searched; and
- transmitting the retrieved first information to the information processing device indicated by the third information through the communication interface.

9. The download server according to claim 8,
wherein the controller deletes the second information and the first information when a particular period has elapsed since the second information and the first information were stored in the memory.

10. The download server according to claim 8,
wherein the downloading request includes a URL of the download server including the first information expressed in a query format.

* * * * *